May 12, 1959
P. R. EWALD
2,886,714
PROCESS AND APPARATUS FOR DETERMINING UNIFORMITY
Filed Dec. 6, 1954
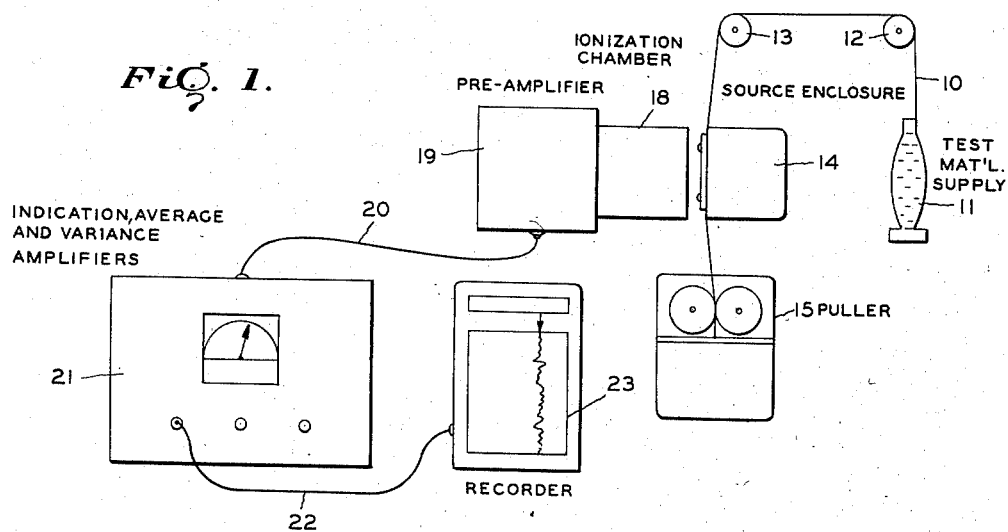
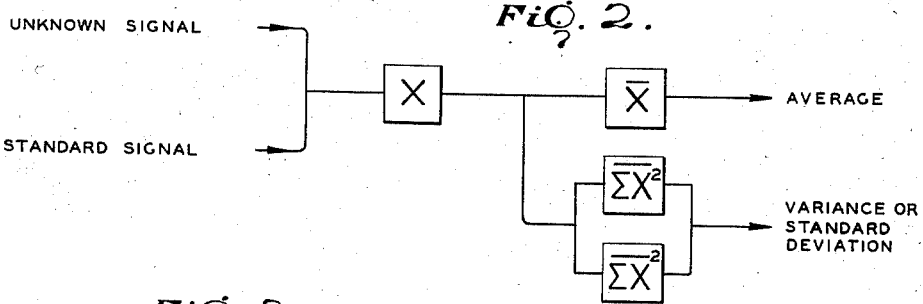
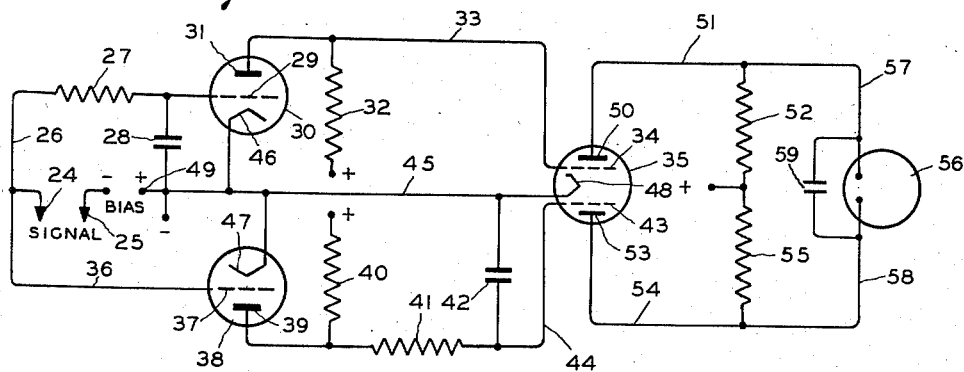
INVENTOR
*Philip R. Ewald*
BY *Cameron, Kerkam & Sutton*
ATTORNEYS United States Patent Office 2,886,714
Patented May 12, 1959

2,886,714

PROCESS AND APPARATUS FOR DETERMINING UNIFORMITY

Philip R. Ewald, Knoxville, Tenn., assignor to The University of Tennessee Research Corporation, Knoxville, Tenn., a corporation of Tennessee Application December 6, 1954, Serial No. 473,209

8 Claims. (Cl. 250—83.6)

This invention relates to processes for continuously determining uniformity and devices for automatically measuring the deviation of any continuous electrical signal.

More particularly this invention relates to processes for measuring the uniformity of yarns, rovings and sliver and to electronic circuits for determining the variance or standard deviation of such yarns, rovings and sliver.

Such processes and devices have wide application in industry and are specifically useful in the textile industry where it is desirable and often necessary to measure the uniformity of yarns, rovings and sliver. Such measurements are efficiently accomplished by continuously measuring and recording the weight per unit length of the material and determining its variance or standard deviation. Having the average weight of the material and its variance or standard deviation the uniformity of the material is known by calculation employing the laws of statistics as is well known in the art.

In such processes when employing the novel electronic circuits of the present invention to continuously measure the variance or standard deviation per unit length of the material undergoing analysis I have found that accurate results can be obtained by continuously moving the material to be measured past a source of beta radiation, collecting the radiations not absorbed by the material in an ionization chamber, utilizing the voltage generated in the ionization chamber, pre-amplified if required, in circuits which compare the signal from the ionization chamber with a standard signal to provide automatically the variance or standard deviation per unit length of the material which when utilized with the measured weight per unit length of the material provides an indication of the uniformity thereof.

It is accordingly an object of the present invention to provide novel processes for determining the uniformity of materials continuously moved past the source of beta radiation.

Another object is to provide novel electronic circuits for use in such processes to determine the variance or standard deviation of such continuously moved material per unit of length.

Another object is to provide such processes in which the weight per unit length of the material is automatically determined and its variance or standard deviation per unit length recorded so that the uniformity of the material may be determined.

Other and further objects of the present invention will appear from the following description of an illustrative embodiment thereof.

While the processes of the present invention and the novel circuits thereof are useful in various phases of industry they will be described hereinafter to illustrate the invention as applied to determining the uniformity of yarns, rovings and sliver. This description of an illustrative embodiment of the present invention should in no way be construed as defining or limiting the same and reference should be had to the appended claims to determine the scope of this invention.

In the accompanying drawings, in which like reference characters indicate like parts, Fig. 1 is a schematic representation of apparatus embodying an illustrative method in accordance with the present invention for continuously determining the uniformity of yarns, rovings or sliver;

Fig. 2 is a schematic diagram of the measurement signal path in the variance determining circuit schematically represented in Fig. 1; and Fig. 3 is a circuit diagram of the novel electronic circuit of the present invention for determining the variance or standard deviation of the specimen being tested.

Referring now to the illustrative embodiment of Fig. 1, a length of yarn, roving or sliver 10 is drawn from a source 11 over guide rollers 12 and 13 past a suitable source of beta radiation 14 by a continuously driven puller 15.

Beta radiation from source 14 not absorbed by the yarn, roving or sliver is collected in ionization chamber 18 and an electric signal is generated which may be suitably pre-amplified, by pre-amplifier 19, if desired. This electrical signal is then taken by wire 20 to suitable indication, averaging and variance amplifiers generally indicated at 21 and the resulting electric current or signal is taken by wire 22 to any suitable recording device 23. Having the variance or standard deviation per unit length recorded at 23 and also having the average weight per unit length recorded at 23 the uniformity of the sample being tested can be readily determined.

The source of beta radiation 14 should be carefully selected and collimated to prevent loss of radiation. The diameter of the materials to be measured in the processes of the present invention vary from less than .01 cm. to over 1 cm. so that the width of the opening in source 14 for emitting radiation varies from 1 to 2 mm. The length of this opening should approximate 0.5 cm. For the purposes of these processes I prefer to use thallium 204 as the source of beta radiation having a half life of 2.7 years and an energy of 0.58 m.e.v. This source of beta radiation should be mounted in any suitable holder or radiation shield and properly collimated to direct the maximum radiation stream toward ionization chamber 18.

The electric signal passing from pre-amplifier 19 through wire 20 into the indication, averaging and variance amplifying circuits generally indicated at 21 is shown as the unknown signal in Fig. 2 and is compared in circuits 21 with a standard signal, also shown in Fig. 2, in known manner, to obtain a difference or resultant value X which may then be amplified in a conventional amplifier and, if desired, this electric signal may be recorded to give a trace of the uniformity of the material being tested. The electric signal designated as X in Fig. 2 may then be put through a conventional averaging amplifier to give the average value $\overline{X}$ which also my be recorded, if desired.

The difference value X is also put through the novel variance or standard deviation circuit of the present invention, as shown schematically in Fig. 2 and in detail in Fig. 3, to provide the average value of the square of X, $\overline{SX^2}$, and the square of the average value of X, $\overline{SX}^2$. The difference of these electric signals is the variance of X and may be indicated or recorded at this point or if the indicator or recorder is provided with a square root scale the square root of this difference may be read directly to obtain the standard deviation. The standard deviation when divided by the value $\overline{X}$, as previously recorded, provides the coefficient of variation.

As pointed out above, the circuit of Fig. 3 measures the square root of the average of the deviation from the mean squared of a variable direct current by the simultaneous measurement of the average of the square of the voltage and the square of the average of the voltage with subsequent recording of the square root of the difference of these two values. The result is the standard deviation of any continuous electrical signal. To obtain this value the unknown electrical signal from pre-amplifier 19 is compared with a standard electric signal in device 21 to obtain the value X, schematically represented in Fig. 2, and the electrical value X is then put into the circuit of Fig. 3 at 24 and 25. The signal from 24 is taken by wire 26 to a resistor-capacitor time constant circuit 27, 28 and the average value of this voltage taken over the time constant of the circuit 27, 28 is then applied to the grid 29 of a suitable triode 30 which develops a plate current proportional to the square of the grid voltage. The current from plate 31 of tube 30 is therefore proportional to the square of the grid voltage and this plate current is therefore a measure of the square of the average of the electrical signal applied at 24. This current flows through a dropping resistor 32 and through wire 33 to one grid 34 of a two-section amplifier tube 35 having identical characteristics in both sections.

The electrical signal from 24 also passes through wire 36 to the grid 37 of a triode 38 which is identical to tube 30 and in which the current from plate 39 is a measure of the square of the value of the electric signal. The current from plate 39 flows through a dropping resistor 40 and through a resistor-capacitor time constant circuit 41, 42 so that the second grid 43 which is connected to resistor-capacitor circuit 41, 42 by wire 44 is held to an average value of the square of the signal supplied at 24 when such average is considered to be taken over the time constant of the circuit 41, 42.

The above described circuit is completed by wire 45 which connects to filaments 46 and 47 of tubes 30 and 38, respectively; to filament 48 of tube 35, to capacitors 28 and 42; and to a suitable bias 49 the other side of which connects to contact 25.

Amplifier 35 is chosen with linear characteristics so that the plate current for each section is proportional to the grid voltage of that section. The plate current from plate 50 passes through wire 51 to resistor 52 and is proportional to the square of the average electric signal from 24. The plate current from plate 53 passes through wire 54 to resistor 55 and is proportional to the average of the square of the electric signal at 24. The voltage drop across resistors 52 and 55 is therefore proportional to the difference of these values which difference is the variance of the voltage signal applied at 24. A suitable meter 56 is connected across resistors 52 and 55 by wires 57 and 58 and measures this variance. A capacitor 59 is connected across the meter 56 to bypass spurious transients or alternating current components induced in the squaring operations and not removed in the time-constant circuits. If meter 56 is provided with a square root scale it shows the square root of the variance which is the standard deviation of the signal supplied at 24. The standard deviation may be recorded as by recorder 23 for use, as described above, in calculating the uniformity of the material being tested.

It should now be apparent to those skilled in the art that by the present invention there are provided novel processes for continuously measuring the uniformity of continuous strands of material such as yarns, rovings and sliver and novel electronic circuits for determining continuously the standard deviation of any continuous electrical signal which in every way satisfies the several objectives discussed above.

Changes in or modifications to the above-described illustrative processes and electronic circuits may now be suggested to those skilled in the art without departing from the present inventive concept. Reference should therefore be had to the appended claims to determine the scope of this invention.

What is claimed is:

1. In a process for continuously determining the uniformity of a strand, the steps of continuously moving the strand past a source of beta radiation, weighing and recording the weight per unit length of the strand, converting the unabsorbed beta radiations into an electric signal, comparing said electric signal with a standard electric signal to obtain a resultant electric signal, obtaining an electric signal which is proportional to the average of said resultant electric signal squared, obtaining an electric signal which is proportional to the square of the average of said resultant electric signal, comparing said two last named electric signals and measuring the square root of the resultant thereof to obtain the standard deviation of the strand.

2. In a process for continuously determining the standard deviation of a continuous electric signal, the steps of comparing the electric signal with a standard electric signal to obtain a resultant electric signal, obtaining an electric signal which is proportional to the average of said resultant electric signal squared, obtaining an electric signal which is proportional to the square of the average of said resultant electric signal, comparing said two last named electric signals and then measuring the square root of the resultant thereof to obtain the standard deviation of the continuous electric signal.

3. In a process for continuously determining the variance of a continuous electric signal, the steps of comparing the electric signal with a standard electric signal to obtain a resultant electric signal, obtaining an electric signal which is proportional to the average of said resultant electric signal squared, obtaining an electric signal which is proportional to the square of the average of said resultant electric signal and then comparing said two last named electric signals to obtain the variance of the continuous electric signal.

4. The combination of a pair of triode elements each developing an output current proportional to the square of the input, an input circuit for each of said elements, a resistor-capacitor time constant circuit connected into the input circuit of one of said elements, an output circuit for each of said elements, a resistor-capacitor time constant circuit connected into the output circuit of the other of said elements, means for applying an electric signal to said input circuits and means for connecting said output circuits in series whereby an output current is derived which is proportional in value to the sum of the average of said electric signal squared and the square of the average of said electric signal.

5. A combination as described in claim 4 having means connected in said series connected output circuits indicating a value proportional to the square root of said output current.

6. The combination of a pair of triode elements each developing an output current proportional to the square of the input, an input circuit for each of said elements, a resistor-capacitor time constant circuit connected into the input circuit of one of said elements, an output circuit for each of said elements, a resistor-capacitor time constant circuit connected into the output circuit of the other of said elements, means for applying an electric signal to said input circuits, a two-section amplifier element, an input circuit for one section of said amplifier element connected to one of said output circuits, an input circuit for the other section of said amplifier element connected to the other of said output circuits, and an output circuit for each section of said amplifier element, said last named circuits being connected in series through a common output lead whereby a current is obtained in said common output lead proportional to the sum of the average of said electric signal squared and the square of the average of said electric signal.

7. A combination as described in claim 6 including means connected to said common output lead indicating a value proportional to the square root of said current.

8. The combination of a pair of triode elements, an input circuit for each of said elements, a resistor-capacitor time constant circuit connected into the input circuit of one of said elements, an output circuit for each of said elements, a resistor-capacitor time constant circuit connected into the output circuit of the other of said elements, means for applying an electric signal to said input circuits, a two-section amplifier element, an input circuit for each section of said amplifier element one of said last named input circuits connecting to one of said output circuits and the other of said last named input circuits connecting to said other of said output circuits, an output circuit for each section of said amplifier element, said last named output circuits being connected in series through a common output lead, means for deriving from said common output lead a current which is proportional in value to the sum of the average of said electric signal squared and the square of the average of said electric signal, and means connected to said common output lead indicating a value proportional to the square root of said current.

References Cited in the file of this patent

UNITED STATES PATENTS

| | | |
|---|---|---|
| 2,264,725 | Shoupp et al. | Dec. 2, 1941 |
| 2,464,249 | McCoy | Mar. 15, 1949 |
| 2,478,203 | McCoy | Aug. 9, 1949 |
| 2,521,116 | Doba | Sept. 5, 1950 |
| 2,527,096 | Howes | Oct. 24, 1950 |
| 2,530,387 | Goertz | Nov. 21, 1950 |
| 2,640,788 | Rockett | June 2, 1953 |